H. R. EVANS.
MOTION PICTURE PROJECTING APPARATUS.
APPLICATION FILED MAR. 28, 1914.
1,261,800.
Patented Apr. 9, 1918.
2 SHEETS—SHEET 1.
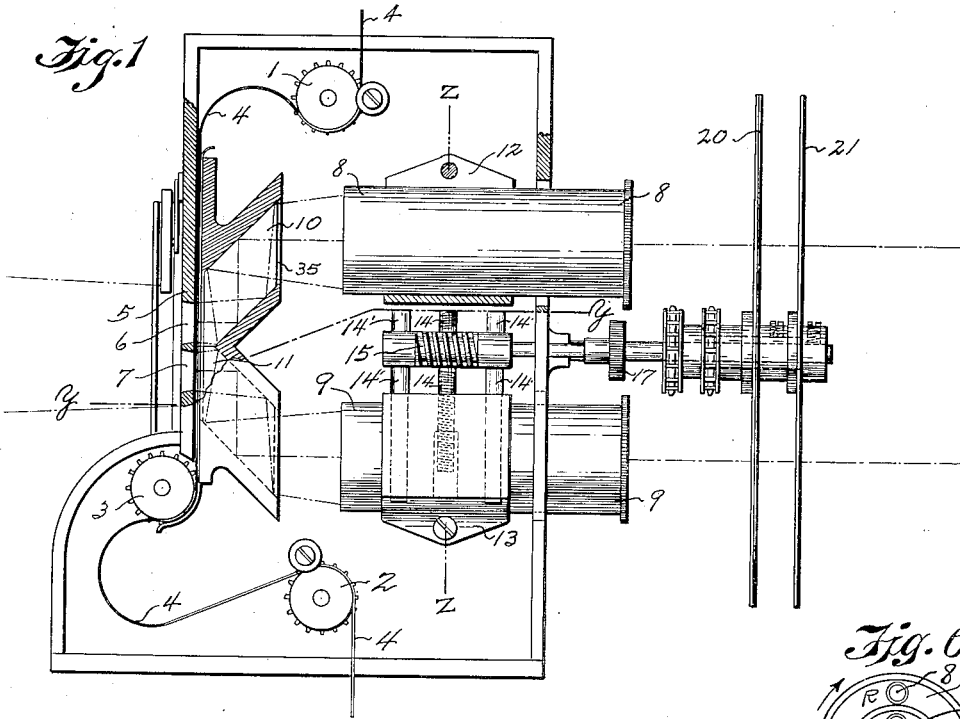
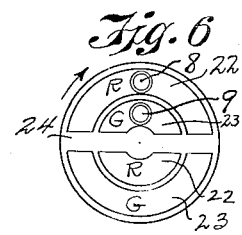
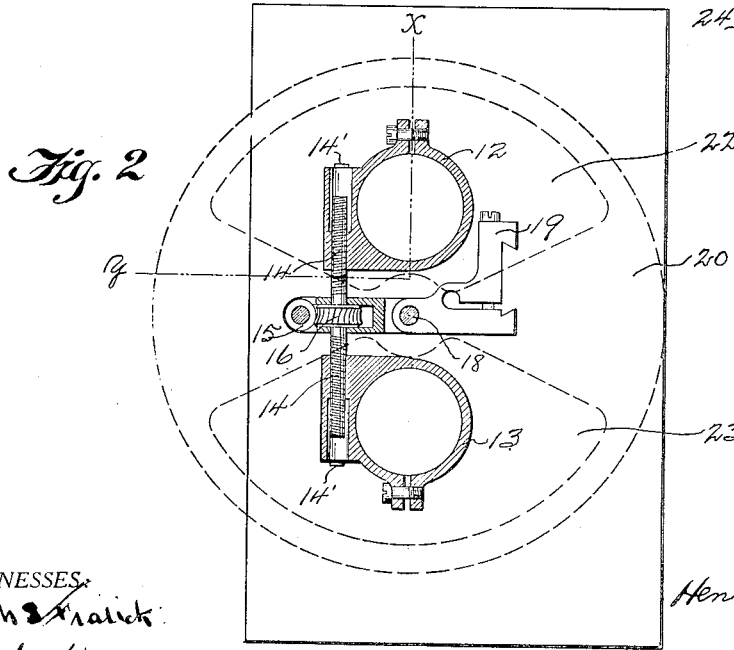
WITNESSES:
INVENTOR.
Henry R. Evans

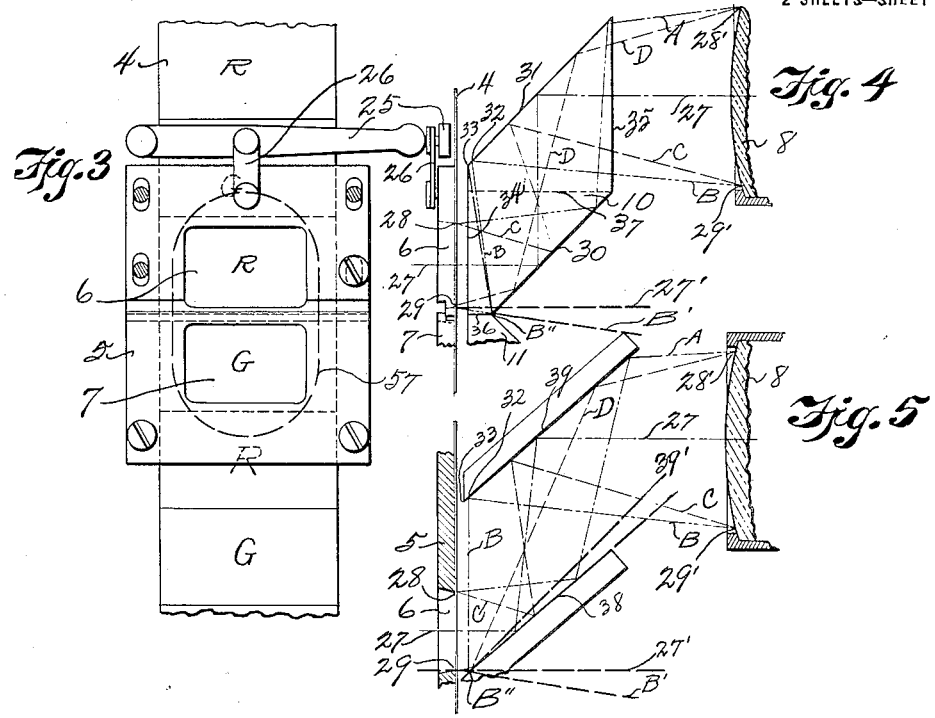

UNITED STATES PATENT OFFICE.

HENRY R. EVANS, OF NEW YORK, N. Y.

MOTION-PICTURE-PROJECTING APPARATUS.

1,261,800.  Specification of Letters Patent.  Patented Apr. 9, 1918.

Application filed March 28, 1914. Serial No. 827,889.

*To all whom it may concern:*

Be it known that I, HENRY R. EVANS, a citizen of the United States, residing at New York city, in the county of New York and State of New York, have invented a new and useful Motion-Picture-Projecting Apparatus, of which the following is a specification.

My invention relates to improvements in motion picture projecting apparatus for exhibiting motion pictures in their "natural colors". Projectors and processes for obtaining "natural color" effects in motion pictures have been up to the present time attended with serious commercial and optical objections either as regards the greatly increased amount of film required for a given subject, the inability to afford sufficient time for proper exposure, extremely short life of the film due to a great increase in speed of movement required, a variation in view point of the various color records causing great trouble in scenes of any depth, the necessity in certain processes of having two operators, one at the projector and one at the screen with means of communication between them or other defects equally serious.

The objects of my invention are, first, to obtain optically-satisfactory "natural color" motion pictures, and secondly to make possible the use of standard size film for the purpose set forth without increasing the length thereof over the length of "black and white" film for any given subject without changing the speed or amount of feed for each picture.

More specifically, the objects of my invention are to provide improved means for superposing successive picture images on the screen in the projection of colored pictures, and to so arrange and construct said means that it can be utilized with the usual motion picture film and with the pictures spaced and arranged thereon and of the same size as usual and the film fed in the usual manner.

My invention consists in the novel features and combinations hereinafter described and more particularly pointed out in the appended claims.

Other objects and advantages of my invention will be seen from the following description and the mechanism illustrated in the accompanying drawings, in which—

Figure 1 is a side elevation of a motion head of a projector embodying my invention, in part section on line X above line Y, see Fig. 2; Fig. 2, is a diagrammatic front view of same in section taken on line Z—Z of Fig. 1; Fig. 3, is a detailed view of the double, adjustable aperture plate; Fig. 4, is a portion of Fig. 1, enlarged, and traces the light rays through one form of reflector to the objective lens; Fig. 5, is a view similar to Fig. 4 but traces the light rays through another form of reflector to the objective lens; and Fig. 6, is a face view to a scale smaller than that of Fig. 1 of a color filter shutter for two color projection.

Similar letters refer to similar parts throughout the several views.

The constantly rotating upper and lower sprockets 1 and 2 respectively and intermittent sprocket 3 of the motion head of my projector, feed the film 4 past the double aperture plate 5 drawing the film down one picture at a time, so that each picture on the film is exposed twice, once at the top window 6 and next at the bottom window 7 at the same instant with its next adjacent preceding picture and succeeding picture respectively, on the film which has been printed from panchromatic negative, the alternate pictures on which were exposed through substantially complementary color screens, say red and green. designated in the accompanying drawings by R and G respectively hereinafter called red and green pictures see Fig. 3. From this arrangement it will be seen that if a red picture is exposed at the upper window 6 as shown in Fig. 3, its next adjacent preceding picture is green and is exposed at the same time at the lower window 7. Now, when the next movement of the film takes place the red picture is drawn down by the intermittent sprocket 3 to the lower window 7 now occupied by the said green picture which passes down and out of the illuminated field but is replaced by the next succeeding green picture which by the same movement has been brought opposite the upper window 6. Each succeeding movement of the film brings about a similar change but always exposing an adjacent red and green picture at the aperture plate, reflected into optical alinement with their respective upper and lower objective lenses 8 and 9 by their correspondingly respective reflecting prisms 10 and 11. Either the prisms 10 and 11 or the objective lenses 8 and 9 must be vertically and laterally relatively adjustable for the purpose of properly superposing the two images upon the screen. I prefer the prisms stationarily mounted and free from possible vibration and the adjustment applied to the objective lenses as shown in Figs. 1 and 2 in which the upper and lower lenses are securely held by their respective carriages 12 and 13 slidably mounted upon the guide-rods 14'—14' and vertically adjustable relatively, but remaining always parallel to each other, as by the right and left hand screw 14 operated through the worm and gear 15 and 16 by the thumb nut 17, as well as laterally adjustable as upon the snug fitting pivot pin 18 mounted in the focusing slide 19 carrying the said lens carriages and vertical adjusting mechanism, and about which pin as an axis the carriage and adjusting mechanism may be made to oscillate within the slight limits of lateral adjustment required.

For the best results the objective lenses should be corrected for the colors used.

It is of course necessary that only red light reach the screen from the red picture and that only green light reach the screen from the green picture. This is accomplished either by stenciling each picture with a flat red or green dye respectively or by interposing a light filter between the screen and the source of light illuminating each picture of the correct respective color. In the machine illustrated in Figs. 1 and 2 I have used a color filter shutter 20 between the objective lenses and the screen close to the regular opaque shutter 21 with very good results. One half of the color filter shutter 20 is fitted with a red filter 22 and the opposite half with a green filter 23. This filter shutter makes one half a revolution to every picture on the film so that when the red picture is in the upper window 6 the red filter 22 is in front of the upper objective lens and the green picture and filter are at the bottom as shown. When the pictures are in the reversed relative position the color filters are correspondingly reversed. The opaque shutter 21 is of the ordinary two blade type and makes one and one half revolution for every picture on the film to reduce the flicker in the well known manner. One or both of these shutters can rotate from a point below both objective lenses in which case they must be correspondingly larger in order to intercept the light of both lenses. In this case the opaque shutter may be arranged as shown in Fig. 5.

In various films the exact distance between pictures varies slightly and in order that the "frames" as well as the colored images may be exactly superposed upon the screen the aperture plate may be made so that the upper and lower windows 6 and 7 have a slight relative adjustment lengthwise of the film as illustrated in Figs. 3 and 4 in which the upper window 6 is slidably mounted and can be adjusted toward and from the lower window 7 by the hand lever 25 through the link 26.

It is very important that the shape, size and position of the reflectors or reflecting prisms used bear a certain relation to the location and size of the pictures upon the film and that area of the objective lens capable of transmitting light from the film to the screen which area is indicated in Figs. 1, 4, and 5 as that portion of the lens lying between the two extreme light beams A and B traced in double dot and dash lines. In practice this area is always greater than the area of the picture on the film in order to obtain the maximum illumination of the image upon the screen. From this fact, it will readily be seen that when the center of the picture on the film is in optical alinement, through reflection, with the optical axis 27—27 of the objective lens and normal thereto as shown in the various figures, a beam of light A traced from the top 28 of the upper aperture 6 to the top of the effective lens area at 28', will diverge from a ray coincident with the optical axis 27—27 at an angle therewith equal to the adjacent angle of divergence of ray B traced from the bottom 29 of the same aperture to the bottom of the effective lens area at 29', which by geometry is equal to angle 27'—29—B' in which 27' is parallel to 27 and B' is parallel to B intersecting each other at point 29. Now, when the first reflecting surface 30 is at an angle of 45 degrees or more to the incident axial ray 27 as in Fig. 4, the point of incidence B'' of ray B must be at a point sufficiently distant from the film 4 that the second reflecting surface 31 of Fig. 4, parallel with the first reflecting surface 30, may receive upon its surface the reflected ray B as at point 32 an appreciable distance within the boundary line 33 thereof as shown, hence, by geometry and the laws of incidence and reflection of light, the included angle between line B''—33 and the film 4 must be greater than the included angle between reflected ray B'' 32 and the film 4. In case a prism is used as shown in Figs. 1 and 4 the first transparent surface 34 and the second transparent surface 35 must be parallel to the film and the vertical and horizontal dimensions of the surface 35 must be greater than the diverged beam of light it must transmit, with a liberal allowance for adjustment of the objective lenses 8 and 9 laterally and toward each other. Prisms of this kind must have their adjacent edges cut off making a fifth surface 36 in order that each may bear a similar symmetrical relation to its picture and objective lens. The reflecting surfaces of the prisms just described must be silvered or otherwise treated to reflect all rays of less than 43 degrees of incidence such as the cross ray C, or these will be absorbed and never reach the screen. Each prism must be of the same kind of glass and each can be made up of two prisms divided in the neighborhood of dotted line 37. One of the prisms 10 or 11 may be pivotally mounted to get the necessary adjustment for superposing, but this method is by no means as good as the adjustment of the objective lenses described, although it is considerably better than adjusting only one of two parallel reflecting surfaces, as has been suggested prior to my invention, because in such case the planes of the two images intended to be superposed on the screen will not coincide throughout, nor will either coincide with the plane of the screen, and there will also be a "keystone distortion", so to speak, of each image, and these features will prevent true superposition of the images throughout, and hence lack of uniform definition or clearness.

Prisms without a fifth surface 36 in Fig. 4, or, silvered parallel reflecting surfaces 38 and 39 may be successfully used if the first reflecting surface 38, see Fig. 5, is at an angle with the incident axial ray 27—27 less than 45 degrees by an angle 39'—B''—38 at least one half as great as angle 27'—29—B' of Fig. 5 derived in the same manner described for Fig. 4, otherwise, ray B of this figure would not strike reflecting surface 39 at point 32 within its surface, but would pass outside its boundary line 33 and never reach the screen. Prisms or reflecting surfaces of this type must also be silvered or platinized in order to obtain total reflection unless prisms of extremely small angle of incidence are used. In all cases the reflecting surfaces must be near the film in order that the diverging rays of each picture may not mingle with each other before being reflected.

My invention is applicable to two-color reproduction of motion pictures in which positive film is used printed from panchromatic negative exposed one picture at a time in the camera in the same manner and at the same speed as for ordinary "black and white" pictures except that each succeeding picture is taken through a different color filter of which there are two and which follow each other in the same recurring sequence throughout the film.

The increased area of illumination required by my two aperture plates will be accompanied by no loss of light if a cylindrically concave lens with a horizontal axis is used as near the condenser lenses as possible and of sufficient curvature to render the illuminated spot upon the aperture plate oval in form and but slightly larger than the combined area of the aperture window as clearly shown in dash lines 57 of Fig. 3. A cylindrically convex lens with a vertical axis placed near the condensers will accomplish the same result or the flat surfaces of the condensers may be ground cylindrically concave or convex with a horizontal or vertical axis respectively to obtain the result described according to the well known laws of optics.

If ordinary "black and white" film is projected in my machine and the images blended upon the screen it is obvious that any scratch marks or other defects of one picture will be partially or wholly masked or counteracted by the other image being projected upon the same spot.

It will thus be seen that my invention provides for accurate superposition of motion picture images upon a screen so that successive pictures on the film taken in different colors can be accurately superposed, and by apparatus adapted to project pictures on motion picture film of ordinary size and fed or moved in the usual manner, so that the changes necessary in adapting the usual projecting apparatus for the successful projection of colored pictures are minimized, and colored motion pictures readily projected with the desired accuracy and sharpness of outline.

While I have described my invention in its preferred embodiment, it will be obvious to those skilled in the art, after having understood the same, that various changes and modifications may be made in the construction and arrangement of the parts without departing from the spirit or scope of the invention, and I do not wish to be understood as limiting my invention other than as indicated in the appended claims.—

I claim as new in my invention:

1. In apparatus for the projection of motion pictures, the combination of optical means to separate the images of a plurality of consecutive pictures on the film from one another by a distance greater than that which separates the said pictures and to keep the planes of the said images parallel to one another, a plurality of objective lenses for projecting said images and supported with their principal optical axes parallel to one another and normal to the said image planes, and means permitting relative adjustment of said objectives in a direction transverse to their said axes while maintaining at the adjusted positions the parallelism of their said axes and the angular relation of those axes to the said image planes, for the purpose of superposing the projected images on a screen.

2. In apparatus for the projection of motion of pictures, the combination of reflecting means adapted to reflect a picture twice, and having first and second reflecting surfaces parallel to one another and inclined to the plane of the pictures, a plurality of objective lenses for projecting images of said pictures and supported with their principal optical axes parallel to one another and normal to the plane of the pictures, and means for producing relative motion between said objectives and said parallel reflecting surfaces transverse to the said principal optical axes without disturbing either the parallelism of the said axes or of the said reflecting surfaces or the angular relation of said axes to the said pictures, for the purpose of superposing the projected images on a screen.

3. In apparatus for the projection of motion pictures, the combination of optical means to separate the images of a plurality of consecutive pictures on the film from one another by a distance greater than that which separates the said pictures and to keep the planes of the said images parallel to one another, a plurality of objective lenses for projecting said images and supported with their principal optical axes parallel to one another and normal to the said image planes and lying in a plane passing through the centers of said two images, and means for moving each of said objectives in a direction transverse to the said axes without disturbing either the parallelism of their said axes or the angular relation of said axes to said image planes, for the purpose of superposing the projected images on a screen.

4. In apparatus for the projection of motion pictures, the combination of optical means to separate the images of a plurality of consecutive pictures on the film from one another by a distance greater than that which separates the said pictures and to keep the planes of the said images parallel to one another, a plurality of objective lenses supported with their principal optical axes parallel to one another and normal to the said image planes, and means to produce relative movement between the said objectives in a plurality of directions parallel to the plane of the images without disturbing either the parallelism of the said axes or the angular relation of said axes to the said image planes, for the purpose of superposing the projected images on a screen.

5. In apparatus for the projection of motion pictures, the combination of optical means to separate the images of a plurality of consecutive pictures on the film from one another by a distance greater than that which separates the said pictures and to keep the planes of the said images parallel to one another, said means being adapted to simultaneously reflect the images of two successive pictures twice and comprising two pair of reflecting surfaces, each pair consisting of first and second reflecting surfaces parallel one to the other, and each pair inclined to the plane of the said images, a plurality of objective lenses for projecting said images and supported with their principal optical axes parallel to one another and normal to the said image planes, and means for producing relative motion between said objectives and at least one pair of said parallel reflecting surfaces transverse to the said principal optical axes without disturbing the parallelism of the said axes or the parallelism of the first and second reflecting surfaces of each pair of reflecting surfaces or the angular relation of said axes to the said image planes, for the purpose of superposing the projected images on a screen.

6. In apparatus for the projection of motion pictures, the combination of optical means to separate the images of a plurality of consecutive pictures on the film from one another by a distance greater than that which separates the said pictures and to keep the planes of the said images parallel to one another, a plurality of objective lenses supported with their principal optical axes parallel to one another and normal to the said image planes, and means to produce relative movement between the said objectives in the direction of the film length and in another direction transverse to their principal optical axes without disturbing either the parallelism of said axes or the angular relation of the same to the said image planes, for the purpose of superposing the projected images on a screen.

7. In apparatus for the projection of motion pictures, the combination of reflecting means adapted to reflect a picture twice, and having first and second reflecting surfaces parallel to one another and inclined to the plane of the pictures, a plurality of objective lenses for projecting images of said pictures and supported with their principal optical axes parallel to one another and normal to the plane of the pictures, and means for producing relative motion between said objectives transverse to the said principal optical axes without disturbing either the parallelism of the said axes or the angular relation of the said axes to the said pictures, for the purpose of superposing the projected images on a screen.

HENRY R. EVANS.

Witnesses:
JOHN KLEIN,
A. A. GRANS.